United States Patent
Chen

(10) Patent No.: US 11,309,949 B2
(45) Date of Patent: Apr. 19, 2022

(54) SIGNAL PROCESSING METHOD AND APPARATUS

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 11 days.

(21) Appl. No.: 16/619,362

(22) PCT Filed: Sep. 14, 2017

(86) PCT No.: PCT/CN2017/101747
§ 371 (c)(1),
(2) Date: Dec. 4, 2019

(87) PCT Pub. No.: WO2019/051717
PCT Pub. Date: Mar. 21, 2019

(65) Prior Publication Data
US 2020/0145082 A1 May 7, 2020

(51) Int. Cl.
H04W 4/00 (2018.01)
H04B 7/06 (2006.01)
H04B 7/08 (2006.01)
H04L 5/00 (2006.01)
H04W 72/04 (2009.01)

(52) U.S. Cl.
CPC ......... *H04B 7/0695* (2013.01); *H04B 7/0617* (2013.01); *H04B 7/088* (2013.01); *H04L 5/0051* (2013.01); *H04W 72/042* (2013.01)

(58) Field of Classification Search
None
See application file for complete search history.

(56) References Cited

U.S. PATENT DOCUMENTS

2013/0279437 A1  10/2013  Ng et al.
2016/0036571 A1*  2/2016  Park ..................... H04B 7/0617
                                                        370/330
(Continued)

FOREIGN PATENT DOCUMENTS

CN        105471559        4/2016
CN        107104781        8/2017
(Continued)

OTHER PUBLICATIONS

Qualcomm Incorporated, "Discussion on QCL", 3GPP TSG RAN WG1 NR Ad-Hoc #3, Sep. 18, 2017.
(Continued)

*Primary Examiner* — Phirin Sam
(74) *Attorney, Agent, or Firm* — Hodgson Russ LLP

(57) ABSTRACT

An embodiment of the present application relates to a signal processing method and apparatus. The method includes: determining a plurality of signals that are quasi-co-located with a first port set of a first reference signal, wherein the first port set is used to send or receive the first reference signal, and the first port set comprises at least one port; determining a target signal among the plurality of signals; and sending or receiving the first reference signal via the first port set according to a quasi-co-location relationship between the first port set and the target signal.

20 Claims, 2 Drawing Sheets

100

Determine a plurality of signals quasi co-located in a first port set of a first reference signal, wherein the first port set is used to transmit or receive the first reference signal and comprises at least one port — S110

Determine a target signal in the plurality of signals — S120

Transmit or receive, according to the quasi co-location relationship between the first port set and the target signal, a signal transmitted or received by the first reference signal via the first port set — S130

(56) References Cited

U.S. PATENT DOCUMENTS

| | | | |
|---|---|---|---|
| 2016/0080121 A1 | 3/2016 | Kim et al. | |
| 2016/0119936 A1 | 4/2016 | Kim et al. | |
| 2016/0255593 A1 | 9/2016 | Blankenship et al. | |
| 2017/0142738 A1* | 5/2017 | You | H04L 5/005 |
| 2018/0323830 A1* | 11/2018 | Park | H04L 25/02 |
| 2019/0124631 A1* | 4/2019 | Ren | H04W 72/042 |
| 2019/0261344 A1* | 8/2019 | Grant | H04B 7/0617 |
| 2019/0349938 A1* | 11/2019 | Chen | H04L 5/0094 |
| 2019/0364556 A1* | 11/2019 | Davydov | H04B 7/088 |
| 2019/0386732 A1* | 12/2019 | Zhang | H04W 72/0446 |
| 2019/0387501 A1* | 12/2019 | Park | H04L 5/005 |
| 2020/0059867 A1* | 2/2020 | Haghighat | H04W 52/367 |
| 2020/0213978 A1* | 7/2020 | Iyer | H04L 1/1812 |

FOREIGN PATENT DOCUMENTS

| | | |
|---|---|---|
| RU | 2599381 | 10/2016 |
| WO | 2014185645 | 11/2014 |

OTHER PUBLICATIONS

Huawei, HiSilicon, "Details of QCL assumptions and related RS design considerations", 3GPP TSG RAN WG1 Meeting NR#3, Sep. 18, 2017.

AT&T, "Remaining details on supporting multi-TRP transmission and reception," 3GPP TSG RAN WG1 Meeting NR#3, R1-1716165, Sep. 2017, 4 pages.

Catt, "L3 Mobility based on CSI-RS based Measurements," 3GPP TSG RAN WG1#89, R1-1707466, May 2017, 5 pages.

Ericsson, "LS response on antenna ports co-location," 3GPP TSG-RAN1 Meeting #70, R1-124020, Aug. 2012, 3 pages.

NTT Docomo, "General Views on QCL Design for NR," 3GPP TSG RAN WG1 Meeting NR#3, R1-1716091, Sep. 2017, 3 pages.

EPO, Office Action for EP Application No. 17925372.9, dated May 28, 2020.

WIPO, ISR for PCT/CN2017/101747, Jun. 14, 2018.

CIPO, Office Action for CA Application No. 3066297, dated Feb. 1, 2021.

FIPS, Office Action for RU Application No. 2019142504, dated Dec. 28, 2020.

EPO, Extended European Search Report for EP. Application No. 17925372.9, dated Sep. 9, 2020.

IPI, Office Action for IN Application No. 201917050631, dated Apr. 15, 2021.

EPO, Communication for EP Application No. 17925372.9, dated Jun. 17, 2021.

LG Electronics, "Discussion on QCL for NR," 3GPP TSG RAN WG1 Meeting #88bis, R1-1704893, Apr. 2017, 2 pages.

IPOS, Office Action for SG Application No. 11201911542T, dated Jul. 16, 2021.

CNIPA, First Office Action for CN Application No. 202011119038.2, dated Jan. 25, 2022.

* cited by examiner

SIGNAL PROCESSING METHOD AND APPARATUS

CROSS-REFERENCE TO RELATED APPLICATION

This application is a U.S. national phase application of International Application No. PCT/CN2017/101747, filed Sep. 14, 2017, the entire disclosure of which is incorporated herein by reference.

TECHNICAL FIELD

The present application relates to the field of communications, and in particular, to a signal processing method and apparatus.

BACKGROUND

In the new radio (NR) system, since the downlink signal received by the terminal may come from different transmission and reception points (TRPs) or different panels, the concept of Quasi-Co-location (QCL) is introduced. If two downlink signals are sent from the same TRP or Panel, it may be considered that the two downlink signals are QCL for the channel large-scale parameter, that is, it may be assumed that the large-scale channels they experience are similar or identical. Therefore, the channel large-scale parameter obtained by one downlink signal may be used for channel estimation of the other downlink signal, to improve the channel estimation performance of the other downlink signal.

On the other hand, different signals in the NR system may be transmitted using the same or different beams. If two signals are transmitted using the same beam, or may be received using the same beam, it may be considered that the two signals are QCL for the spatial receiving parameter, that is, it may be assumed that the sending or receiving beams used by the two signals are similar or identical. Therefore, the sending or receiving beam of one of the signals may be used as the sending or receiving beam of the other signal, to improve the sending or receiving performance.

However, if one signal has the QCL relationship with a plurality of signals at the same time, the terminal cannot know to use the QCL relationship of which signal to facilitate sending or reception.

SUMMARY

The present application provides a signal processing method and apparatus, which can improve sending or reception performance.

In a first aspect, there is provided a signal processing method, including: determining a plurality of signals that are quasi-co-located with a first port set of a first reference signal, wherein the first port set is used to send or receive the first reference signal, and the first port set includes at least one port; determining a target signal among the plurality of signals; and sending or receiving a signal that is sent or received by the first reference signal via the first port set according to a quasi-co-location relationship between the first port set and the target signal.

Therefore, in the signal processing method of the embodiments of the present application, when determining that one reference signal and a plurality of signals are quasi-co-located, the target signal may be determined from the plurality of signals, and the reference signal is sent or received according to a quasi-co-location relationship between the reference signal and the target signal, thereby improving channel estimation performance of the reference signal, and determining an optimal sending beam for the reference signal.

In combination with the first aspect, in an implementation manner of the first aspect, the first reference signal is a downlink signal, and the plurality of signals are downlink signals; or the first reference signal is an uplink signal, and the plurality of signals include an uplink signal and/or a downlink signal.

In combination with the first aspect and the above implementation manner thereof, in another implementation manner of the first aspect, the plurality of signals are different types of signals.

Optionally, the plurality of signals may also include the same type of signals. For example, the plurality of signals may include two CSI-RSs, and the two CSI-RSs are used for different scenarios, one for beam management and the other for CSI measurement. For another example, the plurality of signals may also include two SRSs. Similarly, the two SRSs are used for different scenarios, one for beam management and the other for CSI measurement.

In combination with the first aspect and the above implementation manners thereof, in another implementation manner of the first aspect, the first reference signal is one of a demodulation reference signal (DMRS), a channel state information reference signal (CSI-RS), a channel sounding reference signal (SRS), and a phase tracking reference signal (PTRS).

In combination with the first aspect and the above implementation manners thereof, in another implementation manner of the first aspect, the first port set includes a part of antenna ports or all antenna ports for sending or receiving the first reference signal.

It should be understood that when the first reference signal corresponds to only one port set, the first port set is all antenna ports of the first reference signal.

It should be understood that when the first reference signal corresponds to a plurality of port sets, the first port set may be any one of the plurality of port sets, and the first port set includes a part of the antenna ports corresponding to the first reference signal.

In combination with the first aspect and the above implementation manners thereof, in another implementation manner of the first aspect, the determining the plurality of signals quasi-co-located with the first port set of the first reference signal includes: receiving quasi-co-location indication information sent by a network device; and determining a first signal that is quasi-co-located with the first port set according to the quasi-co-location indication information, the first signal belonging to the plurality of signals.

It should be understood that the terminal device may receive one or more quasi-co-location indication information sent by the network device, and determine a corresponding signal according to each quasi-co-location information.

In combination with the first aspect and the above implementation manners thereof, in another implementation manner of the first aspect, the determining the plurality of signals quasi-co-located with the first port set of the first reference signal includes: determining a second signal that is quasi-co-located with the first port set according to a beam correspondence, the second signal belonging to the plurality of signals.

In combination with the first aspect and the above implementation manners thereof, in another implementation manner of the first aspect, the determining the second signal that is quasi-co-located with the first port set according to the beam correspondence includes: when a beam for sending or receiving a signal on the first port set is the same as a beam for sending or receiving the second signal, determining that the first port set and the second signal are quasi-co-located on a spatial receiving parameter.

In combination with the first aspect and the above implementation manners thereof, in another implementation manner of the first aspect, the quasi-co-location relationship between the first port set and at least two of the plurality of signals is aimed at different channel large-scale parameters.

In combination with the first aspect and the above implementation manners thereof, in another implementation manner of the first aspect, the channel large-scale parameters include at least one parameter of a delay spread, a Doppler spread, a Doppler shift, an average gain, an average delay, a departure of angle, an arrival of angle, a correlation of receiving, a correlation of transmitting, and a spatial receiving parameter.

It should be understood that since the first port set of the first reference signal and different signals in the plurality of signals may be quasi-co-located for different large-scale parameters, different target signals may be determined for different channel large-scale parameters.

In combination with the first aspect and the above implementation manners thereof, in another implementation manner of the first aspect, the determining the target signal among the plurality of signals includes: determining the target signal based on a priority of each of the plurality of signals.

In combination with the first aspect and the above implementation manners thereof, in another implementation manner of the first aspect, the priority of the target signal is higher than a priority of a third signal in the plurality of signals. The third signal may be any one of the plurality of signals except the target signal.

In combination with the first aspect and the above implementation manners thereof, in another implementation manner of the first aspect, the first port set and the target signal are quasi-co-located with respect to a target channel large-scale parameter, and the first port set and the third signal are quasi-co-located with respect to the target channel large-scale parameter.

In combination with the first aspect and the above implementation manners thereof, in another implementation manner of the first aspect, the determining the target signal among the plurality of signals includes: determining the target signal based on a preset rule according to at least one quasi-co-location indication information sent by a network device, wherein the at least one quasi-co-location indication information is used to determine the plurality of signals quasi-co-located with the first port set.

In combination with the first aspect and the above implementation manners thereof, in another implementation manner of the first aspect, the determining the target signal based on the preset rule according to the at least one quasi-co-location indication information sent by the network device includes: determining a last received quasi-co-location indication information in the at least one quasi-co-location indication information, wherein the last received quasi-co-location indication information is used to indicate a fourth signal quasi-co-located with the first port set, the fourth signal belonging to the plurality of signals; and determining the fourth signal as the target signal.

In combination with the first aspect and the above implementation manners thereof, in another implementation manner of the first aspect, the determining the target signal based on the preset rule according to the at least one quasi-co-location indication information sent by the network device include: receiving a target quasi-co-location indication information sent by the network device via a downlink control information (DCI) signaling, wherein the target quasi-co-location indication information belongs to the at least one quasi-co-location indication information; and determining a signal that is indicated by the target quasi-co-location indication information to be quasi-co-located with the first port set as the target signal.

In combination with the first aspect and the above implementation manners thereof, in another implementation manner of the first aspect, the determining the target signal among the plurality of signals includes: receiving indication information sent by a network device, wherein the indication information is used to indicate the target signal from the plurality of signals; and determining the target signal according to the indication information.

In combination with the first aspect and the above implementation manners thereof, in another implementation manner of the first aspect, the indication information is a high layer signaling or a DCI signaling.

In combination with the first aspect and the above implementation manners thereof, in another implementation manner of the first aspect, the determining the target signal among the plurality of signals includes: determining the target signal according to an acquiring manner of each of the plurality of signals.

In combination with the first aspect and the above implementation manners thereof, in another implementation manner of the first aspect, the acquiring manner includes acquiring by the quasi-co-location indication information and acquiring according to a beam correspondence.

In combination with the first aspect and the above implementation manners thereof, in another implementation manner of the first aspect, the first port set of the first reference signal and a fifth signal being quasi-co-located indicates that a signal on the first port set and the fifth signal have the same or similar channel large-scale parameter, the fifth signal being any one of the plurality of signals.

In combination with the first aspect and the above implementation manners thereof, in another implementation manner of the first aspect, the first port set of the first reference signal and the fifth signal being quasi-co-located indicates that a beam for sending or receiving a signal on the first port set is the same as or similar to a beam for sending or receiving the fifth signal, the fifth signal being any one of the plurality of signals.

In combination with the first aspect and the above implementation manners thereof, in another implementation manner of the first aspect, the first port set and the target signal are quasi-co-located with respect to a target channel large-scale parameter, and the sending or receiving the signal sent or received by the first reference signal via the first port set according to the quasi-co-location relationship between the first port set and the target signal includes: performing a channel estimation on the first port set according to the target channel large-scale parameter obtained by receiving the target signal.

In combination with the first aspect and the above implementation manners thereof, in another implementation manner of the first aspect, the sending or receiving the signal sent or received by the first reference signal via the first port set according to the quasi-co-location relationship between the first port set and the target signal includes: determining a target beam that sends or receives the target signal; and sending or receiving a signal of the first reference signal on the first port set via the target beam.

Therefore, in the signal processing method of the embodiments of the present application, when determining that one reference signal and a plurality of signals are quasi-co-located, a target signal may be determined in the plurality of signals, the reference signal and the plurality of signals may be quasi-co-located with respect to different channel large-scale parameters, the corresponding different target signals are determined in the plurality of signals with respect to the different channel large-scale parameters, and the reference signal is sent or received according to the quasi-co-location relationship between the reference signal and each of the target signals, thereby improving the channel estimation performance of the reference signal, and determining the best sending beam for the reference signal.

In a second aspect, there is provided a signal processing apparatus for performing the method in the first aspect or any of the possible implementation manners of the first aspect described above. In particular, the apparatus includes units for performing the method in the first aspect or any of the possible implementation manners of the first aspect described above.

In a third aspect, there is provided a signal processing apparatus, including: a storage unit and a processor, where the storage unit is used for storing instructions, the processor is used for executing the instructions stored in the memory, and when the processor executes the instructions stored in the memory, the execution causes the processor to perform the method in the first aspect or any of the possible implementation manners of the first aspect.

In a fourth aspect, there is provided a computer readable medium for storing a computer program, and the computer program includes instructions for performing the method in the first aspect or any of the possible implementation manners of the first aspect.

In a fifth aspect, there is provided a computer program product including instructions, and when a computer operates the instructions of the computer program product, the computer executes the signal processing method in the first aspect or any of the possible implementation manners of the first aspect described above. In particular, the computer program product may be run on the signal processing apparatus of the above third aspect.

DETAILED DESCRIPTION

The technical solutions in the embodiments of the present application will be described below with reference to the accompanying drawings.

The technical solutions of the embodiments of the present application may be applied to various communication systems, for example, a global system of mobile communication (GSMC) system, a code division multiple access (CDMA) system, a wideband code division multiple access (WCDMA) system, general packet radio service (GPRS), a long term evolution (LTE) system, a LTE frequency division duplex (FDD) system, a LTE Time Division Duplex (TDD), a universal mobile telecommunication system (UMTS), a worldwide interoperability for microwave access (WiMAX) communication system, a future fifth generation (5th generation, 5G) system or NR, etc.

The terminal device in the embodiments of the present application may refer to a user equipment, an access terminal, a subscriber unit, a subscriber station, a mobile station, a mobile stage, a remote station, a remote terminal, a mobile device, a user terminal, a terminal, a wireless communication device, a user agent, or a user apparatus. The terminal device may also be a cellular phone, a cordless phone, a session initiation protocol (SIP) phone, a wireless local loop (WLL) station, a personal digital assistant (PDA), a handheld device with a wireless communication function, a computing device or other processing devices connected to wireless modems, an in-vehicle device, a wearable device, a terminal devices in future 5G network, or a terminal device in future evolved public land mobile network (PLMN) and the like, which are not limited in the embodiments of the present application.

The network device in the embodiments of the present application may be a device for communicating with a terminal device. The network device may be a base transceiver station (BTS) in a GSMC system or a CDMA system, or a base station (NodeB, NB) in a WCDMA system, which may also be an evolutional NodeB (eNB or eNodeB) in the LTE system, or a wireless controller in a cloud radio access network (CRAN) scenario, or the network device may be a relay station, an access point, an in-vehicle device, a wearable device, a network device in a future 5G network, or a network device in a future evolved PLMN network, which are not limited in the embodiments of the present application.

Figure 1:
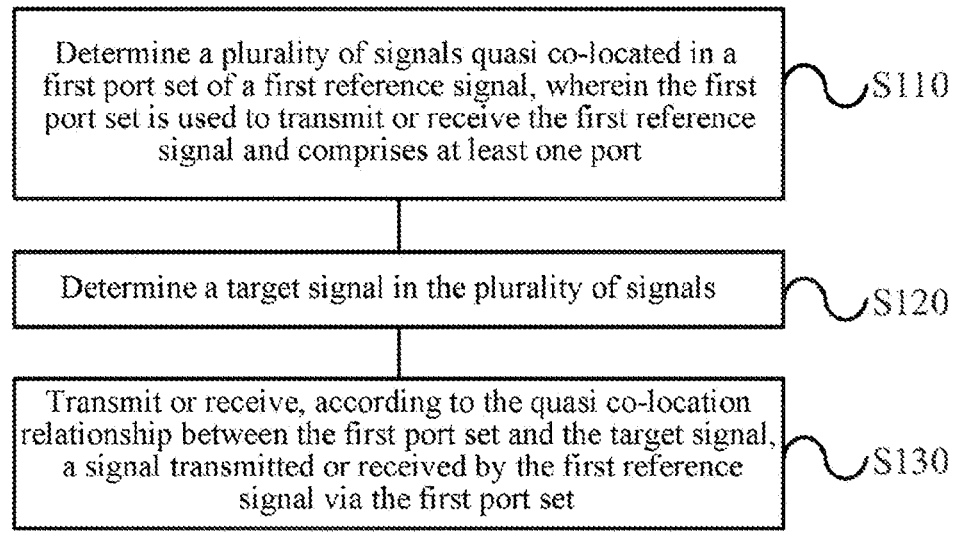
FIG. 1 is a schematic flowchart of a signal processing method according to an embodiment of the present application.

FIG. 1 shows a schematic flow diagram of a signal processing method 100 according to an embodiment of the present application. The method 100 may be performed by a terminal device. As shown in FIG. 1, the method 100 includes: S110, determining a plurality of signals that are quasi-co-located with a first port set of the first reference signal, where the first port set is used to send or receive the first reference signal, and the first port set includes at least one port; S120, determining a target signal in the plurality of signals; and S130, sending or receiving signal that is sent or received by the first reference signal via the first port set according to a quasi-co-location relationship between the first port set and the target signal.

Therefore, in the signal processing method of the embodiments of the present application, when determining that one reference signal and a plurality of signals are quasi-co-located, the target signal may be determined in the plurality of signals, and the reference signal may be sent or received according to a quasi-co-location relationship between the reference signal and the target signal, thereby improving channel estimation performance of the reference signal, and determining an optimal sending beam for the reference signal.

In S110, a plurality of signals that are quasi-co-located with the first port set of the first reference signal are determined, where the first port set of the first reference signal and the plurality of signals being quasi-co-located may refer to that the first port set is quasi-co-located with each of the at least one port set corresponding to the plurality of signals. The first reference signal may be an uplink signal or a downlink signal, the plurality of signals may include an uplink signal and/or a downlink signal, and the plurality of signals may include different types of signals, or the same type of signals used in different scenarios.

Optionally, the first reference signal may be an uplink signal or a downlink signal. For example, the first reference signal may be a demodulation reference signal (DMRS) or a channel state information reference signal (CSI-RS) or a channel sounding reference signal (SRS) or a phase tracking reference signal (PTRS). Specifically, if the first reference signal is the DMRS, it may be a DMRS of a physical broadcast channel (PBCH), a physical uplink control channel (PUCCH), or a physical downlink control channel (PDCCH), a physical downlink shared channel (PUSCH) or a physical uplink shared channel (PDSCH). If the first reference signal is a CSI-RS, it may be a CSI-RS for beam management or a CSI-RS for channel state information (CSI) measurement. If the first reference signal is an SRS, it may be an SRS for beam management or an SRS for CSI measurement.

Optionally, the first reference signal may be an uplink signal, and the plurality of signals may include an uplink signal and/or a downlink signal. For example, the first reference signal is a downlink signal, and the plurality of signals may include one or more types of signals among a synchronization signal block (SSB), a CSI-RS, a tracking reference signal (TRS), a PTRS, and a DMRS. For another example, if the first reference signal is an uplink signal, the plurality of signals may be at least one of SSB, CSI-RS, SRS, TRS, PTRS, and DMRS.

Optionally, the plurality of signals may include different types of signals, and may also include the same type of signals, for example, may include two CSI-RSs, and the two CSI-RSs are used in different scenarios, one for the beam management, the other for the CSI measurement. For another example, the plurality of signals may also include two SRSs. Similarly, the two SRSs are used for different scenarios, one for the beam management and the other for the CSI measurement.

In the embodiments of the present disclosure, the first port set may be all or part of ports the first reference signal. Specifically, the first reference signal may correspond to one or more port sets, and each port set may include one or more ports. The first port set may be any one of the port sets corresponding to the first reference signal. For example, when the first reference signal corresponds to one port set, the first port set includes all ports of the first reference signal. For another example, when the first reference signal corresponds to a plurality of port sets, the first port set may be any one of the plurality of port sets, that is, the first port set may include a part of ports of the first reference signal.

It should be understood that the terminal device may determine the plurality of signals that are quasi-co-located with the first port set according to QCL indication information sent by the network device, or according to a beam correspondence. Optionally, the plurality of signals may include a part of signals which are determined by the QCL indication information, and may further include a part of signals which are determined by the beam correspondence.

Optionally, as an embodiment, the terminal device receives the QCL indication information sent by the network device, and according to the QCL indication information, the first signal of the plurality of signals may be determined, where the first signal may be any one of the plurality of signals. Specifically, the terminal device receives the QCL indication information that is sent by the network device, where the QCL indication information is used to indicate a quasi-co-location relationship between the first port set of the first reference signal and the first signal, and the terminal device determines the first signal according to the QCL indication information. The terminal device may receive one or more QCL indication information sent by the network device, and determine one signal that is quasi-co-located with the first port set according to each QCL indication information in the at least one QCL indication information, and then the terminal device may determine at least one of the plurality of signals according to the QCL indication information sent by the network device.

Optionally, as an embodiment, the terminal device may determine the second signal of the plurality of signals according to the beam correspondence, where the second signal may be any one of the plurality of signals. When the terminal device determines that the beam that sends or receives the second signal is the same as the beam that sends or receives the signal on the first port set of the first reference signal, the first port set of the first reference signal may be determined to be quasi-co-located with the second signal according to the beam correspondence. Specifically, the first port set and the second signal are quasi-co-located for the spatial receiving parameter. The second signal may be any one of the plurality of signals, that is, at least one of the plurality of signals may be determined according to the beam correspondence.

In the embodiments of the present application, the quasi-co-location relationship between the first port set of the first reference signal and the plurality of signals may be for the same or different channel large-scale parameters. For example, any two of the plurality of signals are a first signal and a second signal, respectively, the first port set of the first reference signal and the first signal are quasi-co-located for the spatial receiving parameter, and the first port set of the first reference signal and the second signal are quasi-co-located for a doppler shift and a doppler spread, and the embodiments of the present application are not limited thereto.

In the embodiments of the present application, the channel large-scale parameter may include at least one of the following parameters: a delay spread, a doppler spread, a doppler shift, an average gain, an average delay, a departure of angle, an arrival of angle, a correlation of receiving, a correlation of transmitting, and a spatial receiving parameter.

In S120, a target signal is determined among the plurality of signals. The terminal device may determine different target signals for different channel large-scale parameters. The first port set of the first reference signal is quasi-co-located with the plurality of signals, and is quasi-co-located with the plurality of signals with respect to the same or different channel large-scale parameters, therefore a plurality of target signals may be determined among the plurality of signals, and each target signal is directed to a different channel large-scale parameter. For example, the terminal device may determine the first target signal and the second target signal, where the first port set and the first target signal are quasi-co-located for the spatial receive parameter, and the first port set of the first reference signal and the second target signal are quasi-co-located for the Doppler shift and the Doppler spread, and the embodiments of the present application are not limited thereto.

Optionally, as an embodiment, the terminal device may determine the target signal among the plurality of signals according to priorities of the plurality of signals. For example, the terminal device may determine the priority of each of the plurality of signals, and use the signal with the highest priority as the target signal, that is, for any one of the plurality of signals, for example, the third signal, the priority of the third signal is not higher than that of the target signal.

For another example, when there are at least two signals in the plurality of signals, and the first port set and the at least two signals are quasi-co-located for the same channel large-scale parameter, the signal with the highest priority in the at least two signals is determined as the target signal, that is, for any one of the at least two signals, such as the third signal, the third signal has a priority no higher than the target signal.

It should be understood that different priorities may be set for different signals. For example, for the downlink signal, the priority of the TRS may be set higher than the CSI-RS, and the priority of the CSI-RS may be higher than the SSB. For the uplink signal, the priority of the SRS may be higher than the CSI-RS, and the priority of the CSI-RS may be higher than the PTRS. The embodiments of the present application are not limited thereto.

Optionally, as an embodiment, the terminal device may determine the target signal in the plurality of signals based on a preset rule according to the QCL indication information. Specifically, the terminal device may determine the target signal according to an order in which the QCL indication information is received. For example, the terminal device may receive at least one QCL indication information sent by the network device, and according to the at least one QCL indication information, the terminal device may determine at least one signal that is quasi-co-located with the first port set. The terminal device may use the signal indicated by the last QCL indication information as the target signal, or use the signal indicated by the first QCL indication information as the target signal, and the embodiments of the present application are not limited thereto.

For example, the terminal device determines the last QCL indication information, and the last QCL indication information indicates the fourth signal, then the fourth signal is the target signal.

Optionally, as an embodiment, the terminal device may determine the target signaling according to the signaling that carries the QCL indication information. For example, the terminal device may use the signal indicated by the QCL indication information received via the downlink control information (DCI) signaling as the target signal, and the embodiments of the present application are not limited thereto.

Optionally, as an embodiment, the terminal device may also determine the target signal according to the indication information sent by the network device, where the indication information may be sent by using a high layer signaling or a DCI signaling. For example, the terminal device receives the indication information that is sent by the network device by using the DCI signaling, and the indication information indicates that the sixth signal of the plurality of signals has a quasi-co-location relationship with the first port set, then the terminal device determines the sixth signal as the target signal.

For another example, the network side indicates the quasi-co-location relationship between the first port set of the first reference signal of the terminal device and the sixth and seventh signals to the terminal device by using a radio resource control (RRC) signaling in advance, then indicates the quasi-co-location relationship between the first port set of the first reference signal and the sixth reference signal therein to the terminal device by using the DCI signaling, and then the terminal device may use the sixth signal as the target signal according to the RRC signal and the DCI signaling. In this case, the indication in the DCI may use only 1-bit information for indicating the quasi-co-location relationship of the sixth signal or the seventh signal.

Optionally, as an embodiment, the terminal device may further determine the target signal according to acquiring manners of the plurality of signals. Specifically, the terminal device may acquire the plurality of signals in various manners. For example, the terminal device may determine one or more signals that are quasi-co-located with the first port set according to the QCL indication information sent by the network device. For another example, the terminal device may determine one or more signals that are quasi-co-located with the first port set according to the beam correspondence.

When the plurality of signals quasi-co-located with the first port set include signals acquired by different acquiring manners, a signal acquired by a certain acquiring manner may be used as the target signal. For example, the signal determined by the QCL indication information may be prioritized as the target signal, and the embodiments of the present application are not limited thereto.

It should be understood that the terminal device may determine the target signal by one or more of the above manners. For example, at least two signals may be determined among the plurality of signals by any one of the above manners, and the target signal in the at least two signals may be obtained by another manner. For another example, when the terminal device determines a plurality of target signals that are quasi-co-located with the first port set for different channel large-scale parameters, the determining manners of individual target signals may be the same or different, and the embodiments of the present application are not limited thereto.

In S130, according to a quasi-co-location relationship between the first port set and the target signal, a signal sent or received by the first reference signal through the first port set is sent or received. In the embodiments of the present application, the quasi-co-location relationship between the first port set and the fifth signal of the plurality of signals may be expressed as follows: the signal on the first port set of the first reference signal and the fifth signal pass through similar or identical channel large-scale parameter, or the beam used by the terminal device to send or receive the signal on the first port set of the first reference signal is similar to or the same as the beam used to send or receive the fifth signal, where the fifth signal may be any one of the plurality of signals.

Optionally, as an embodiment, a quasi-co-location relationship between the first port set of the first reference signal and the target signal indicates that the channel large-scale parameters undergone by the signal on the first port set of the first reference signal and the target signal are similar or identical. Specifically, the terminal device may perform channel estimation on the first port set of the first reference signal according to the target channel large-scale parameter obtained by measuring the target signal.

Optionally, as an embodiment, the quasi-co-location relationship between the first port set of the first reference signal and the target signal indicates that the beam used to send or receive the signal on the first port set of the first reference signal is similar or identical to the beam used to send or receive the target signal. Specifically, the terminal device may perform sending or reception of the signal on the first port set of the first reference signal based on the beam used to send or receive the target signal.

For example, the sending beam of the target signal may be used as the sending beam of the signal on the first port set of the first reference signal or as the receiving beam of the signal on the first port set of the first reference signal. As another example, the receiving beam of the target signal may be used as the sending beam of the signal on the first port set of the first reference signal or as the receiving beam of the signal on the first port set of the first reference signal.

Therefore, in the signal processing method of the embodiments of the present application, when determining that one reference signal and a plurality of signals are quasi-co-located, a target signal may be determined in the plurality of signals, where the reference signal and the plurality of signals may be quasi-co-located for different channel large-scale parameters, and with respect to the different channel large-scale parameters, the corresponding different target signals are determined in the plurality of signals, and the reference signal is sent or received according to the quasi-co-location relationship of the reference signal with each of the target signals, thereby improving the channel estimation performance of the reference signal, and determining the best sending beam for the reference signal.

It should be understood that, in the various embodiments of the present application, the sizes of the sequence numbers of the foregoing processes do not mean the order of execution sequence, and the order of execution of each process should be determined by its function and internal logic, and should not constitute any limitation to the implementation process of the embodiments of the present application.

In addition, the term "and/or" herein only refers to an association relationship describing associated objects, indicating that there may be three relationships. For example, A and/or B may indicate the following three relationships: A exists separately, A and B exist at the same time, and B exists separately. In addition, the character "/" in the present disclosure generally indicates that the contextual objects have an "or" relationship.

The signal processing method according to the embodiments of the present application has been described in detail above with reference to FIG. 1, and a signal processing apparatus according to an embodiment of the present application will be described below with reference to FIGS. 2 to 3.

Figure 2:
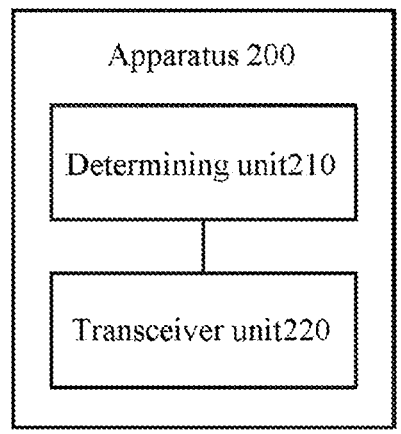
FIG. 2 is a schematic block diagram of a signal processing apparatus according to an embodiment of the present application.

As shown in FIG. 2, the signal processing apparatus 200 according to an embodiment of the present application includes: a determining unit 210 and a transceiver unit 220.

Specifically, the determining unit 210 is configured to determine a plurality of signals that are quasi-co-located with a first port set of the first reference signal, where the first port set is used to send or receive the first reference signal, and the first port set includes at least one port; the determining unit 210 is further configured to determine a target signal among the plurality of signals; and the transceiver unit 220 is configured to send or receive a signal that is sent or received by the first reference signal via the first port set according to a quasi-co-location relationship between the first port set and the target signal.

Therefore, in the signal processing apparatus of the embodiments of the present application, when determining that one reference signal and a plurality of signals are quasi-co-located, the target signal may be determined in the plurality of signals, and the reference signal is sent or received according to a quasi-co-location relationship between the reference signal and the target signal, thereby improving channel estimation performance of the reference signal, and determining an optimal sending beam for the reference signal.

Optionally, the first reference signal is a downlink signal, and the plurality of signals are downlink signals; or the first reference signal is an uplink signal, and the plurality of signals include an uplink signal and/or a downlink signal.

Optionally, the plurality of signals are different types of signals.

Optionally, the first reference signal is one of DMRS, CSI-RS, SRS, and PTRS.

Optionally, the first port set includes a part of antenna ports or all antenna ports for sending or receiving the first reference signal.

Optionally, the transceiver unit 220 is specifically configured to receive quasi-co-location indication information sent by a network device, and the determining unit 210 is configured to determine a first signal that is co-located with the first port set according to the quasi-co-location indication information, where the first signal belongs to the plurality of signals.

Optionally, the determining unit 210 is specifically configured to determine a second signal that is quasi-co-located with the first port set according to a beam correspondence, where the second signal belongs to the plurality of signals.

Optionally, the determining unit 210 is specifically configured to, if the beam that sends or receives the signal on the first port set is the same as the beam that sends or receives the second signal, determine that the first port set and the second signal are quasi-co-located on a spatial receiving parameter.

Optionally, the quasi-co-location relationship between the first port set and at least two of the plurality of signals is aimed at different channel large-scale parameters.

Optionally, the channel large-scale parameters include at least one parameter of a delay spread, a Doppler spread, a Doppler shift, an average gain, an average delay, a departure of angle, an arrival of angle, a correlation of receiving, a correlation of transmitting, and a spatial receiving parameter.

Optionally, the determining unit 210 is specifically configured to determine the target signal according to a priority of each of the plurality of signals.

Optionally, the target signal has a higher priority than the third signal in the plurality of signals.

Optionally, the first port set and the target signal are quasi-co-located with respect to the target channel large-scale parameter, and the first port set and the third signal are quasi-co-located with respect to the target channel large-scale parameter.

Optionally, the determining unit 210 is specifically configured to determine according to a preset rule, the target signal according to the at least one quasi-co-location indication information sent by the network device, where the at least one quasi-co-location indication information is used to determine the plurality of signals that are quasi-co-located with the first port set.

Optionally, the determining unit 210 is specifically configured to: determine a last received quasi-co-location indication information in the at least one quasi-co-location indication information, where the last received quasi-co-location indication information is used to indicate fourth signal that is quasi-co-located with the first port set, and the fourth signal belongs to the plurality of signals; and determine the fourth signal as the target signal.

Optionally, the transceiver unit 220 is configured to receive a target quasi-co-location indication information sent by the network device via a DCI signaling, where the target quasi-co-location indication information belongs to the at least one quasi-co-location indication information; and the determining unit 210 is specifically configured to determine a signal that is indicated by the target quasi-co-location indication information to be quasi-co-located with the first port set as the target signal.

Optionally, the transceiver unit 220 is configured to receive indication information that is sent by the network device, where the indication information is used to indicate the target signal from the plurality of signals; and the determining unit 210 is specifically configured to determine, according to the indication information, the target signal.

Optionally, the indication information is a high layer signaling or a DCI signaling.

Optionally, the determining unit 210 is specifically configured to determine the target signal according to an acquiring manner of each of the plurality of signals.

Optionally, the acquiring manner includes: acquiring by the quasi-co-location indication information and acquiring according to a beam correspondence.

Optionally, the first port set of the first reference signal and a fifth signal being quasi-co-located indicates that a signal on the first port set and the fifth signal have the same or similar channel large-scale parameter, or the first port set of the first reference signal and the fifth signal being quasi-co-located indicates that a beam for sending or receiving a signal on the first port set is the same as or similar to a beam for sending or receiving the fifth signal, the fifth signal being any one of the plurality of signals.

Optionally, the first port set is quasi-co-located with the target signal for the target channel large-scale parameter, and the determining unit 210 is specifically configured to: perform a channel estimation on the first port set according to the target channel large-scale parameter obtained by receiving the target signal.

Optionally, the determining unit 210 is specifically configured to: determine a target beam that sends or receives the target signal; and the transceiver unit 220 is specifically configured to: send or receive a signal of the first reference signal on the first port set by using the target beam.

Optionally, the apparatus 200 may be a terminal device.

It should be understood that the signal processing apparatus 200 according to the embodiments of the present application may correspond to performing the method 100 in the embodiments of the present application, and the above and other operations and/or functions of the respective units in the apparatus 200 respectively implement the corresponding processes of the terminal device of the respective methods in FIG. 1, which are not described in details herein for the sake of brevity.

Therefore, according to the signal processing apparatus in the embodiments of the present application, when determining that one reference signal and a plurality of signals are quasi-co-located, a target signal may be determined among the plurality of signals, where the reference signal and the plurality of signals may be quasi-co-located for different channel large-scale parameters, and with respect to the different channel large-scale parameters, the corresponding different target signals are determined in the plurality of signals, and the reference signal is sent or received according to the quasi-co-location relationship of the reference signal with each of the target signals, thereby improving the channel estimation performance of the reference signal, and determining the best sending beam for the reference signal.

Figure 3:
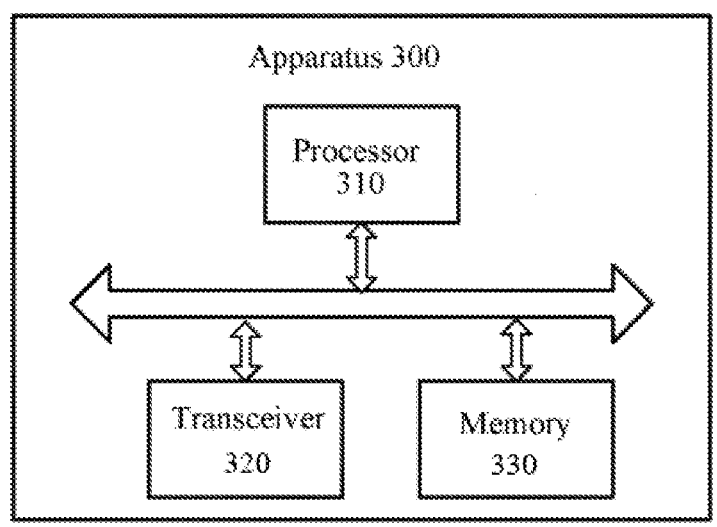
FIG. 3 is another schematic block diagram of a signal processing apparatus according to an embodiment of the present application.

FIG. 3 shows a schematic block diagram of a terminal device 300 according to an embodiment of the present application. As shown in FIG. 3, the terminal device 300 includes a processor 310 and a transceiver 320. The processor 310 is connected to the transceiver 320. Optionally, the terminal device 300 further includes a memory 330, and the memory 330 is connected to the processor 310. The processor 310, the memory 330 and the transceiver 320 communicate with each other, and transmit and/or control the data signal through an internal connection path. The memory 330 may be used to store instructions, and the processor 310 is configured to execute the instructions stored in the memory 330 to control the transceiver 320 to send information or signals. The processor 310 is configured to: determine a plurality of signals that are quasi-co-located with the first port set of the first reference signal, the first port set being used for sending or receiving the first reference signal, and the first port set including at least one port. The processor 310 is further configured to: determine a target signal among the plurality of signals. The transceiver 320 is configured to: send or receive a signal that is sent or received by the first reference signal via the first port set according to a quasi-co-location relationship between the first port set and the target signal.

Therefore, in the signal processing apparatus of the embodiments of the present application, when determining that one reference signal and a plurality of signals are quasi-co-located, the target signal may be determined in the plurality of signals, and according to a quasi-co-location relationship between the reference signal and the target signal, the reference signal is sent or received, thereby improving channel estimation performance of the reference signal, or determining an optimal sending beam for the reference signal.

Optionally, the first reference signal is a downlink signal, and the plurality of signals are downlink signals; or the first reference signal is an uplink signal, and the plurality of signals include an uplink signal and/or a downlink signal.

Optionally, the plurality of signals are different types of signals.

Optionally, the first reference signal is one of DMRS, CSI-RS, SRS, and PTRS.

Optionally, the first port set includes a part of antenna ports or all antenna ports for sending or receiving the first reference signal.

Optionally, the transceiver 320 is configured to: receive quasi-co-location indication information sent by the network device, and the processor 310 is further configured to: determine, according to the quasi-co-location indication information, a first signal that is quasi-co-located with the first port set, the first signal belonging to the plurality of signals.

Optionally, the processor 310 is further configured to: determine, according to a beam correspondence, a second signal that is quasi-co-located with the first port set, the second signal belonging to the plurality of signals.

Optionally, the processor 310 is further configured to: if the beam that sends or receives the signal on the first port set is the same as the beam that sends or receives the second signal, determine that the first port set and the second signal are quasi-co-located on a spatial receiving parameter.

Optionally, the quasi-co-location relationship between the first port set and at least two of the plurality of signals is aimed at different channel large-scale parameters.

Optionally, the channel large-scale parameters include at least one parameter of a delay spread, a Doppler spread, a Doppler shift, an average gain, an average delay, a departure of angle, an arrival of angle, a correlation of receiving, a correlation of transmitting, and a spatial receiving parameter.

Optionally, the processor 310 is further configured to: determine the target signal according to a priority of each of the plurality of signals.

Optionally, the target signal has a higher priority than the third signal in the plurality of signals.

Optionally, the first port set and the target signal are quasi-co-located with respect to a target channel large-scale parameter, and the first port set and the third signal are quasi-co-located with respect to the target channel large-scale parameter.

Optionally, the processor 310 is further configured to: determine, according to a preset rule, the target signal according to the at least one quasi-co-location indication information sent by the network device, where the at least one quasi-co-location indication information is used to determine the plurality of signals quasi-co-located with the first port set signal.

Optionally, the processor 310 is further configured to: determine a last received quasi-co-location indication information in the at least one quasi-co-location indication information, where the last received quasi-co-location indication information is used to indicate a fourth signal that is quasi-co-located with the first port set, and the fourth signal belongs to the plurality of signals; and determine the fourth signal as the target signal.

Optionally, the transceiver 320 is configured to: receive a target quasi-co-location indication information sent by the network device via a downlink control information (DCI) signaling, wherein the target quasi-co-location indication information belongs to the at least one quasi-co-location indication information; and the processor 310 is further configured to determine a signal that is indicated by the target quasi-co-location indication information to be quasi-co-located with the first port set as the target signal.

Optionally, the transceiver 320 is configured to: receive indication information sent by the network device, where the indication information is used to indicate the target signal from the plurality of signals; and the processor 310 is further configured to: determine, according to the indication information, the target signal.

Optionally, the indication information is a high layer signaling or a DCI signaling.

Optionally, the processor 310 is further configured to: determine the target signal according to a manner in which each of the plurality of signals is acquired.

Optionally, the acquiring manner includes: acquiring by the quasi-co-location indication information and acquiring according to a beam correspondence.

Optionally, the first port set of the first reference signal and a fifth signal being quasi-co-located indicates that a signal on the first port set and the fifth signal have the same or similar channel large-scale parameter, or the first port set of the first reference signal and the fifth signal being quasi-co-located indicates that a beam for sending or receiving a signal on the first port set is the same as or similar to a beam for sending or receiving the fifth signal, the fifth signal being any one of the plurality of signals.

Optionally, the first port set and the target signal are quasi-co-located with respect to a target channel large-scale parameter, and the processor 310 is further configured to: perform a channel estimation on the first port set according to the target channel large-scale parameter obtained by receiving the target signal.

Optionally, the processor 310 is further configured to: determine a target beam that sends or receives the target signal; and the transceiver 320 is configured to: send or receive a signal of the first reference signal on the first port set by using the target beam.

Alternatively, the apparatus 300 may be a terminal device.

It should be understood that the signal processing apparatus 300 according to the embodiments of the present application may correspond to the signal processing apparatus 200 in the embodiments of the present application, and may correspond to the terminal device for performing the method 100 according to the embodiments of the present application, and the above and other operations and/or functions of the respective units in the apparatus 300 are respectively for the purpose of implementing the corresponding processes of the terminal devices in the respective methods in FIG. 1, which are not described herein again for brevity.

Therefore, according to the signal processing apparatus in the embodiments of the present application, a quasi-co-location relationship between a reference signal and a plurality of signals is determined, and a target signal in the plurality of signals is determined, where the reference signal and the plurality of signals may be quasi-co-located for different channel large-scale parameters, and with respect to the different channel large-scale parameters, the corresponding different target signals are determined in the plurality of signals, and the reference signal is sent or received according to the quasi-co-location relationship between the reference signal and each of the target signals, thereby improving the channel estimation performance of the reference signal, and being capable of determining the best sending beam for the reference signal.

It should be understood that the above method embodiments of the present application may be applied to a processor, or implemented by a processor. The processor may be an integrated circuit chip and has a signal processing capability. In an implementation process, the steps in the foregoing method embodiments may be completed using an integrated logic circuit of hardware in the processor or an instruction in a form of software. The above processor may be a general purpose processor, a digital signal processor (DSP), an application specific integrated circuit (ASIC), a field programmable gate array (FPGA) or other programmable logic device, a discrete gate, or a transistor logic device, and a discrete hardware assembly, which may implement or execute the methods, steps, and logic diagrams disclosed in the embodiments of the present application. The general purpose processor may be a microprocessor or the processor may be any conventional processor, or the like. The steps of the methods disclosed with reference to the embodiments of the present application may be directly executed and accomplished by means of a hardware decoding processor or may be executed and accomplished using a combination of hardware and software modules in the decoding processor. The software module may be located in a mature storage medium in the art, such as a random access memory, a flash memory, a read-only memory, a programmable read-only memory, an electrically erasable programmable memory or a register. The storage medium is located in the memory. The processor reads information from the memory and completes the steps of the foregoing methods in combination with the hardware of the processor.

It may be understood that the memory in the embodiments of the present application may be a volatile memory or a non-volatile memory, or may include both volatile and non-volatile memories. The non-volatile memory may be a read-only memory (ROM), a programmable ROM (PROM), an erasable PROM (EPROM), an electrically EPROM (EEPROM), or a flash memory. The volatile memory may be a random access memory (RAM) that acts as an external high speed cache. By way of illustration and not limitation, RAM in many forms is available such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that the memories of the systems and methods described herein are intended to include but not limited to these and any other suitable types of memories.

Those of ordinary skills in the art may be aware that, the units and algorithm steps of individual examples described in combination with the embodiments disclosed herein, may be implemented by electronic hardware or a combination of computer software and the electronic hardware. Whether the functions are performed by hardware or software depends on particular applications and design constraint conditions of the technical solutions. Those of ordinary skills in the art may use different methods to implement the described functions for each particular application, but it should not be considered that the implementation goes beyond the scope of the present application.

It may be clearly understood by those of ordinary skills in the art that, for the purpose of convenient and brief description, for a detailed working process of the foregoing systems, devices, and units, reference may be made to a corresponding process in the foregoing method embodiments, and details are not described herein again.

In the several embodiments provided in the present application, it should be understood that the disclosed systems, devices and methods may be implemented in other ways. For example, the device embodiments described above are merely illustrative. For example, the division of the units is only one kind of logical function division. In practice, there may be other division manner. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, they may be located in one place, or may be distributed on multiple network units. Some or all of the units may be selected according to actual needs to achieve the objectives of the solutions in the embodiments.

In addition, each functional unit in each embodiment of the present disclosure may be integrated in one processing unit, or each unit may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the related art or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk, or an optical disk.

The foregoing descriptions are merely detailed embodiments of the present disclosure, and the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be subjected to the protection scope of the claims.

What is claimed is:

1. A signal processing method, comprising:
   determining, by a terminal device, a plurality of signals that are quasi-co-located with a first port set in a first reference signal, wherein the first port set is used to send or receive the first reference signal, the first port set comprises all antenna ports for sending or receiving the first reference signal, and the plurality of signals are different types of signals;
   determining, by the terminal device, a target signal among the plurality of signals; and
   receiving, by the terminal device, the first reference signal via the first port set according to a quasi-co-location relationship between the first port set and the target signal,
   wherein the first reference signal and any one of the plurality of signals have the same or similar channel large-scale parameters, or a beam for sending or receiving the first reference signal is the same as or similar to a beam for sending or receiving any one of the plurality of signals.

2. The method according to claim 1, wherein the determining, by the terminal device, the plurality of signals that are quasi-co-located with the first port set of the first reference signal comprises:
   determining, by the terminal device, a second signal that is quasi-co-located with the first port set according to a beam correspondence, the second signal belonging to the plurality of signals.

3. The method according to claim 2, wherein the determining, by the terminal device, the second signal that is quasi-co-located with the first port set according to the beam correspondence comprises:
   when a beam for sending or receiving a signal on the first port set is the same as a beam for sending or receiving the second signal, determining that the first port set and the second signal are quasi-co-located on a spatial receiving parameter.

4. The method according to claim 1, wherein the determining, by the terminal device, the target signal among the plurality of signals comprises:
   determining, by the terminal device, the target signal based on a priority of each of the plurality of signals.

5. The method according to claim 4, wherein the priority of the target signal is higher than a priority of a third signal in the plurality of signals and wherein the first port set and the target signal are quasi-co-located with respect to a target channel large-scale parameter, and the first port set and the third signal are quasi-co-located with respect to the target channel large-scale parameter.

6. The method according to claim 1, wherein the determining, by the terminal device, the target signal among the plurality of signals comprises:
   determining, by the terminal device, the target signal based on a preset rule according to at least one quasico-location indication information sent by a network device, wherein the at least one quasi-co-location indication information is used to determine the plurality of signals quasi-co-located with the first port set.

7. The method according to claim 1, wherein the first reference signal is one of a demodulation reference signal (DMRS), a channel state information reference signal (CSI-RS), a channel sounding reference signal (SRS), and a phase tracking reference signal (PTRS).

8. The method according to claim 1, wherein the determining, by the terminal device, the plurality of signals that are quasi-co-located with the first port set of the first reference signal comprises:
receiving, by the terminal device, quasi-co-location indication information sent by a network device; and
determining, by the terminal device, a first signal that is quasi-co-located with the first port set according to the quasi-co-location indication information, the first signal belonging to the plurality of signals.

9. The method according to claim 1, wherein the channel large-scale parameters comprise at least one parameter of a delay spread, a Doppler spread, a Doppler shift, an average gain, an average delay, a departure of angle, an arrival of angle, a correlation of receiving, a correlation of transmitting, and a spatial receiving parameter.

10. The method according to claim 1, wherein the receiving, by the terminal device, the first reference signal via the first port set according to the quasi-co-location relationship between the first port set and the target signal comprises:
determining, by the terminal device, a target beam that sends or receives the target signal; and
receiving, by the terminal device, the first reference signal via the target beam.

11. A terminal device, comprising:
a storage unit; and
a processor,
wherein the storage unit is used for storing instructions, the processor is used for executing the instructions stored in the storage unit, and when the processor executes the instructions stored in the storage unit, the execution causes the processor to:
determine a plurality of signals that are quasi-co-located with a first port set of the first reference signal, wherein the first port set is used to send or receive the first reference signal, the first port set comprises all antenna ports for sending or receiving the first reference signal, and the plurality of signals are different types of signals;
determine a target signal among the plurality of signals; and
receive the first reference signal via the first port set according to a quasi-co-location relationship between the first port set and the target signal,
wherein the first reference signal and any one of the plurality of signals have the same or similar channel large-scale parameters, or a beam for sending or receiving the first reference signal is the same as or similar to a beam for sending or receiving any one of the plurality of signals.

12. The terminal device according to claim 11, wherein the execution further causes the processor to:
determine a second signal that is quasi-co-located with the first port set according to a beam correspondence, the second signal belonging to the plurality of signals.

13. The terminal device according to claim 12, wherein the execution further causes the processor to:

when a beam for sending or receiving a signal on the first port set is the same as a beam for sending or receiving the second signal, determine that the first port set and the second signal are quasi-co-located on a spatial receiving parameter.

14. The terminal device according to claim 11, wherein the execution further causes the processor to:
determine the target signal based on a priority of each of the plurality of signals.

15. The terminal device according to claim 14, wherein the priority of the target signal is higher than a priority of a third signal in the plurality of signals and
wherein the first port set and the target signal are quasi-co-located with respect to a target channel large-scale parameter, and the first port set and the third signal are quasi-co-located with respect to the target channel large-scale parameter.

16. The terminal device according to claim 11, wherein the execution further causes the processor to:
determine the target signal based on a preset rule according to at least one quasi-co-location indication information sent by a network device, wherein the at least one quasi-co-location indication information is used to determine the plurality of signals quasi-co-located with the first port set signal.

17. The terminal device according to claim 11, wherein the first reference signal is one of a demodulation reference signal (DMRS), a channel state information reference signal (CSI-RS), a channel sounding reference signal (SRS), and a phase tracking reference signal (PTRS).

18. The terminal device according to claim 11, wherein the execution further causes the processor to perform:
receive quasi-co-location indication information sent by a network device; and
determine a first signal that is quasi-co-located with the first port set according to the quasi-co-location indication information, the first signal belonging to the plurality of signals.

19. The terminal device according to claim 11, wherein the channel large-scale parameters comprise at least one parameter of a delay spread, a Doppler spread, a Doppler shift, an average gain, an average delay, a departure of angle, an arrival of angle, a correlation of receiving, a correlation of transmitting, and a spatial receiving parameter.

20. A network device, comprising:
a storage unit; and
a processor,
wherein the storage unit is used for storing instructions, the processor is used for executing the instructions stored in the storage unit, and when the processor executes the instructions stored in the storage unit, the execution causes the processor to:
send quasi-co-location indication information to a terminal device; wherein the quasi-co-location indication information indicates a first signal is quasi-co-located with a first port set of the terminal device, the first signal belonging to a plurality of signals
send the plurality of signals to the terminal device; wherein the first reference signal and any one of the plurality of signals have the same or similar channel large-scale parameters, or a beam for sending or receiving the first reference signal is the same as or similar to a beam for sending or receiving any one of the plurality of signals.

* * * * *